US012724195B2

(12) United States Patent
Yu et al.

(10) Patent No.: US 12,724,195 B2
(45) Date of Patent: Sep. 1, 2026

(54) THREE-DIMENSIONAL PHOTONIC INTERCONNECTS

(71) Applicant: Taiwan Semiconductor Manufacturing Company Limited, Hsinchu (TW)

(72) Inventors: Chen-Hua Yu, Hsinchu City (TW); Tung-Liang Shao, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 286 days.

(21) Appl. No.: 18/512,077

(22) Filed: Nov. 17, 2023

(65) Prior Publication Data

US 2025/0164689 A1 May 22, 2025

(51) Int. Cl.
*G02B 6/12* (2006.01)
*G02B 6/122* (2006.01)
*G02B 6/125* (2006.01)

(52) U.S. Cl.
CPC ......... *G02B 6/12002* (2013.01); *G02B 6/122* (2013.01); *G02B 6/125* (2013.01);
(Continued)

(58) Field of Classification Search
CPC ............................ G02B 6/12002; G02B 6/125
See application file for complete search history.

(56) References Cited

U.S. PATENT DOCUMENTS 6,324,313 B1 11/2001 Allman et al.
9,583,912 B2 * 2/2017 Chou ...................... H01S 3/067
(Continued)

FOREIGN PATENT DOCUMENTS

DE 10054370 A1 * 5/2002 ............. G02B 6/125
EP 4163685 A1 4/2023
TW 202443217 A 4/2023

OTHER PUBLICATIONS

TW Patent and Trademark Office; TW Application No. 113101340; Office Action mailed Apr. 29, 2025; 12 pages.
(Continued)

*Primary Examiner* — Charlie Y Peng
(74) *Attorney, Agent, or Firm* — The Marbury Law Group, PLLC

(57) ABSTRACT

An embodiment photonic device may include a first photonic interconnect formed over a first horizontal plane, a second photonic interconnect formed over a second horizontal plane that is vertically displaced relative to the first horizontal plane, and a photonic coupler connected to the first photonic interconnect and the second photonic interconnect. The photonic coupler may be configured such that first photonic signals that are incident on the photonic coupler from the first photonic interconnect are directed by the photonic coupler into the second photonic interconnect, and second photonic signals that are incident on the photonic coupler from the second photonic interconnect are directed by the photonic coupler into the first photonic interconnect. The photonic coupler may further include a photonic via that connects the first photonic interconnect to the second photonic interconnect and that allows photonic signals to propagate between the first photonic interconnect and the second photonic interconnect.

20 Claims, 12 Drawing Sheets

(52) U.S. Cl.
CPC .............. *G02B 2006/12061* (2013.01); *G02B 2006/12104* (2013.01); *G02B 2006/12147* (2013.01)

(56) References Cited

U.S. PATENT DOCUMENTS

| | | | | |
|---|---|---|---|---|
| 2002/0118907 | A1* | 8/2002 | Sugama | G02B 6/43 385/129 |
| 2004/0001665 | A1* | 1/2004 | Zoorob | H01S 3/0635 385/16 |
| 2005/0047708 | A1* | 3/2005 | Ma | G02B 6/125 385/14 |
| 2006/0051101 | A1* | 3/2006 | Vishkin | H04B 10/801 398/164 |
| 2007/0140616 | A1* | 6/2007 | Sugita | G02B 27/0994 385/32 |
| 2015/0078712 | A1* | 3/2015 | Brunner | G02B 6/4219 264/1.24 |
| 2023/0084761 | A1 | 3/2023 | Witmer et al. | |
| 2023/0085761 | A1 | 3/2023 | Witmer et al. | |
| 2025/0047708 | A1 | 2/2025 | Albero et al. | |

OTHER PUBLICATIONS

TW Patent and Trademark Office; TW Application No. 113101340; Office Action mailed Dec. 6, 2024; 20 pages.
TW Patent and Trademark Office; TW Application No. 113101340; Office Action mailed Mar. 3, 2026; 10 pages.

* cited by examiner

THREE-DIMENSIONAL PHOTONIC INTERCONNECTS

BACKGROUND

Many computing applications use optical (i.e., photonic) signals to provide secure high-speed data transmission. Various emerging technologies are also being developed that may provide functionality to perform computing operations directly on optical/photonic signals. Silicon photonics is a promising technology area that uses semiconductor device processing techniques to provide systems including integrated electronic and photonic components. Such components may be used for the generation, routing, modulation, processing, and detection of light. Together, these functions form an optical analog to electronic integrated circuits (IC) and, as such, may constitute photonic integrated circuits (PIC).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
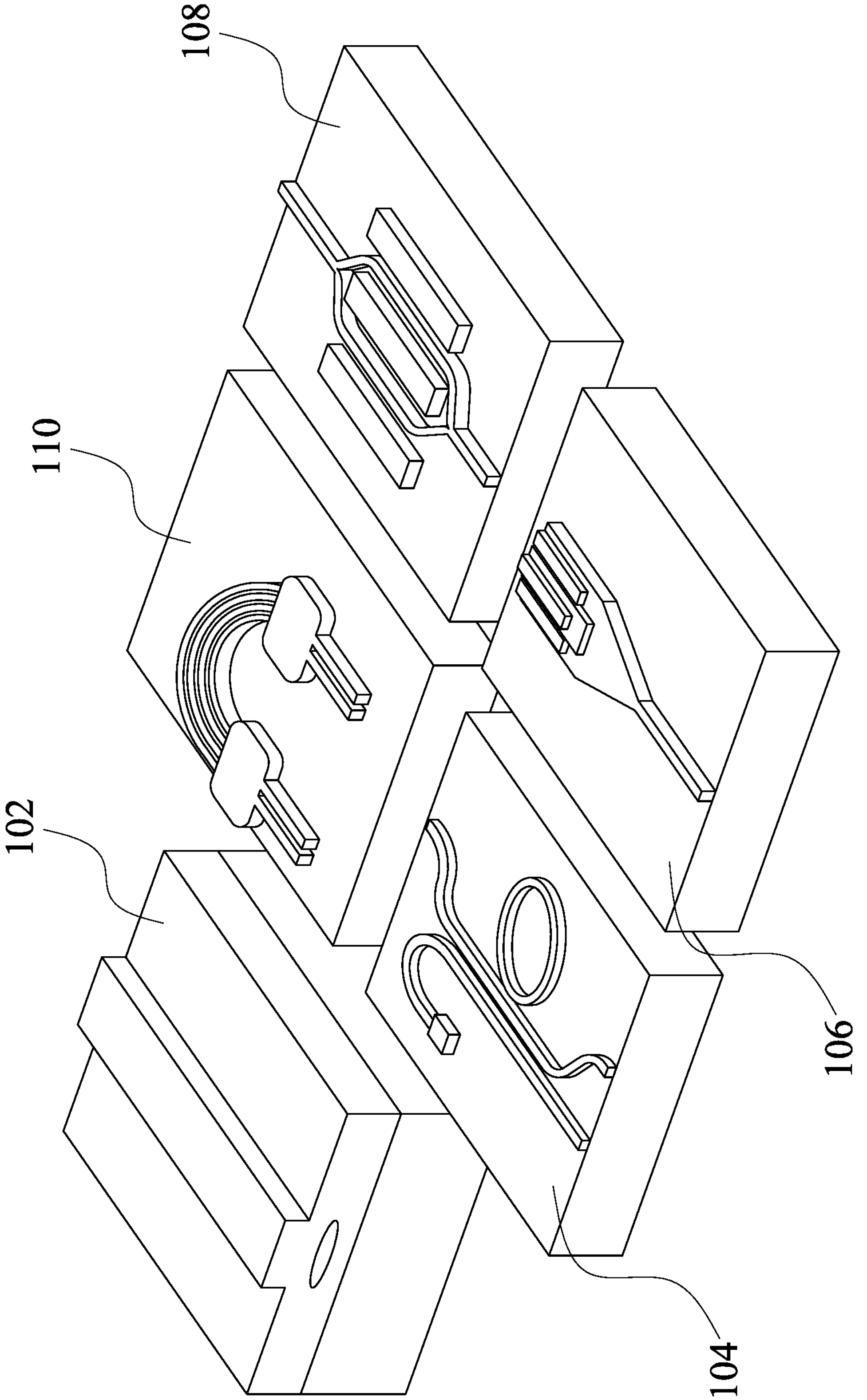
FIG. 1 is a schematic illustration of various components that may be used in a photonic computing system.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless explicitly stated otherwise, each element having the same reference numeral is presumed to have the same material composition and to have a thickness within a same thickness range.

Photonic interconnects play an important role in photonic computing systems. Various embodiments disclosed herein may be advantageous by providing multi-directional, three-dimensional (3D), photonic interconnects. Such 3D photonic interconnects may allow formation of photonic integrated circuits having an increased integration density and may provide smaller devices with reduced optical insertion loss relative to systems that do not utilize 3D photonic interconnects.

An embodiment photonic device may include a first photonic interconnect formed over a first horizontal plane, a second photonic interconnect formed over a second horizontal plane that is vertically displaced relative to the first horizontal plane, and a photonic coupler connected to the first photonic interconnect and the second photonic interconnect. The photonic coupler may be configured such that first photonic signals that are incident on the photonic coupler from the first photonic interconnect are directed by the photonic coupler into the second photonic interconnect, and second photonic signals that are incident on the photonic coupler from the second photonic interconnect are directed by the photonic coupler into the first photonic interconnect. The photonic coupler may further include a photonic via that connects the first photonic interconnect to the second photonic interconnect and that allows photonic signals to propagate between the first photonic interconnect and the second photonic interconnect.

According to a further embodiment, a photonic device may include a first photonic interconnect including a first photonic propagation path and a second photonic propagation path, and a second photonic interconnect including a third photonic propagation path and a fourth photonic propagation path. The first photonic interconnect may be formed over a first horizontal plane and the second photonic interconnect may be formed over a second horizontal plane that is vertically displaced relative to the first horizontal plane. The photonic device may further include a photonic coupler that includes a first photonic via that connects the first photonic propagation path to the third photonic propagation path and a second photonic via that connects the second photonic propagation path to the fourth photonic propagation path.

According to a further embodiment, a photonic device may include a first photonic waveguide, having a first dielectric constant, formed within a first layer of a cladding material having a second dielectric constant that is less than the first dielectric constant. The photonic device may further include a second photonic waveguide, having the first dielectric constant, formed within a second layer of the cladding material, having the second dielectric constant that is less than the first dielectric constant. According to various embodiments, the second layer of the cladding material may be vertically displaced relative to the first layer of the cladding material. The photonic device may further include a photonic via formed within a third layer of the cladding material such that the photonic via photonically couples the first photonic waveguide and the second photonic waveguide. Further, the third layer of the cladding material may be formed such as to separate the first layer of the cladding material and the second layer of the cladding material.

FIG. 1 is an illustration of various components that may be used in a photonic computing system. System components may include a generation device also referred to as a photonic source 102 such as a laser or light-emitting diode (LED), a routing device that may include a plurality of waveguides 104 configured to route optical signals, and a detector that includes one or more optical/photonic detectors 106 configured to detect optical/photonic signals and to convert received optical/photonic signals into output electrical signals. Additional components may include a modulation device that includes one or more optical modulators 108 and photonic processing components 110. The one or more optical modulators 108 may be configured to impose an amplitude and/or phase modulation on an input optical signal generated by the photonic source 102. The photonic processing components 110 may be configured to perform logic operations on the modulated optical signal. The one or more optical modulators 108 may take an input electronic signal and modulate the input optical signal to impose an amplitude and/or phase modulation in response to the input electronic signal. In this way, the one or more optical modulators 108 may be used to convert data provided in the form of an electronic signal into data encoded as a photonic signal. Similarly, the one or more optical detectors 106 may convert processed photonic signals back into output electrical signals.

Figure 2A:
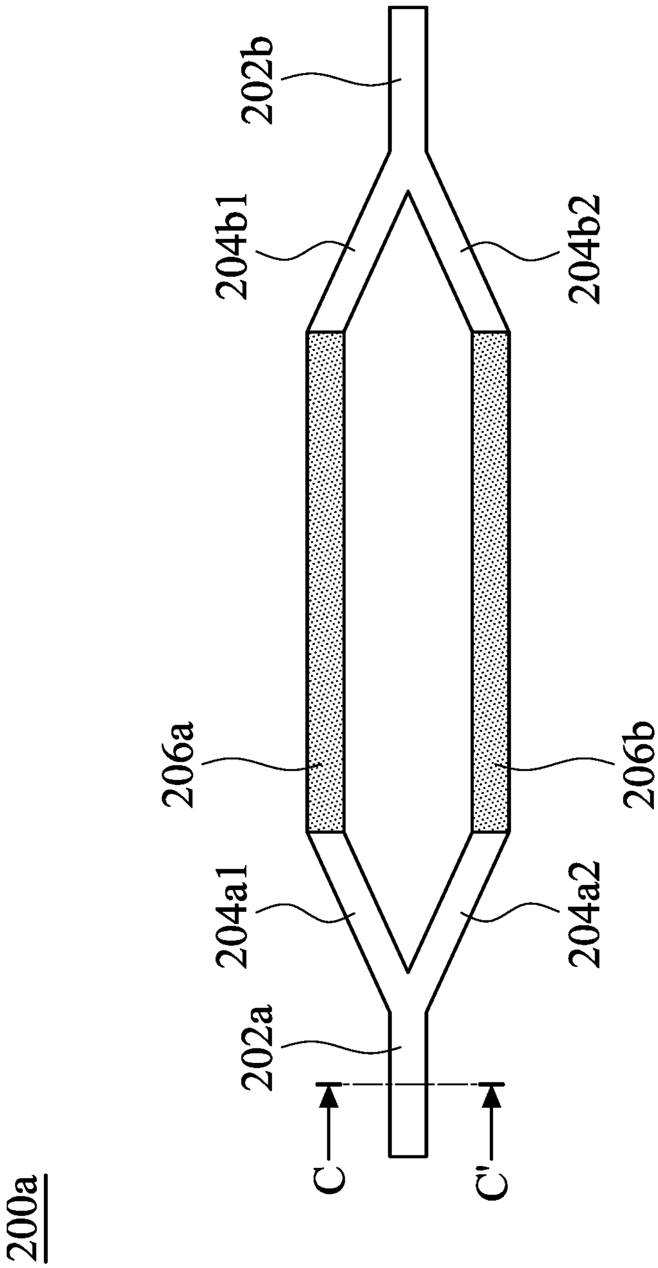
FIG. 2A is a top view of an electro-optic modulator that may be used in a photonic computing system.

FIG. 2A is a top view of an electro-optic modulator 200*a* that may be used in a photonic computing system. The cross-section C-C' indicates a vertical plane defining the vertical cross-sectional view shown in FIG. 2C. The electro-optic modulator 200*a* may include an input waveguide 202*a* and an output waveguide 202*b*. The input waveguide 202*a* may be configured to receive an input optical signal and the output waveguide 202*b* may be configured to provide an output signal that is a modulated version of the input optical signal. As shown, the input waveguide 202*a* may branch into a first waveguide segment 204*a*1 and a second waveguide segment 204*a*2. As such, the input waveguide 202*a*, the first waveguide segment 204*a*1, and the second waveguide segment 204*a*2 may act as a beam splitter.

An input signal received by the input waveguide 202*a* may be split into two optical signals (i.e., two copies of the input optical signal) that may be carried by the first waveguide segment 204*a*1 and the second waveguide segment 204*a*2, respectively. A first optical signal carried by the first waveguide segment 204*a*1 may be provided to a first modulator portion 206*a* and a second optical signal carried by the second waveguide segment 204*a*2 may be provided to a second modulator portion 206*b*. The first modulator portion 206*a* and the second modulator portion 206*b* may modify an amplitude and/or a phase of the respective first optical signal and the second optical signal.

The modified first optical signal transmitted along a third waveguide segment 204*b*1 and the modified second optical signal transmitted along a fourth waveguide segment 204*b*2 may then be combined to form an output optical signal that is provided to the output waveguide 202*b*. In this regard, the third waveguide segment 204*b*1 may be optically coupled to the first modulator portion 206*a* and the fourth waveguide segment 204*b*2 may be optically coupled to the second modulator portion 206*b*. In turn, the third waveguide segment 204*b*1 and the fourth waveguide segment 204*b*2 may be optically coupled to the output waveguide 202*b*. As such, the third waveguide segment 204*b*1, the fourth waveguide segment 204*b*2, and the output waveguide 202*b* may act as a beam combiner. The first modulator portion 206*a* and the second modulator portion 206*b* may each modulate the respective first optical signal and the second optical signal according to an electro-optic effect. In this regard, the first modulator portion 206*a* and the second modulator portion 206*b* may each include a material having electro-optic properties. Such an electro-optic material may have optical properties (e.g., index of refraction and absorption coefficient) that may vary as a function of an applied electrical bias (i.e., voltage difference).

Figure 2B:
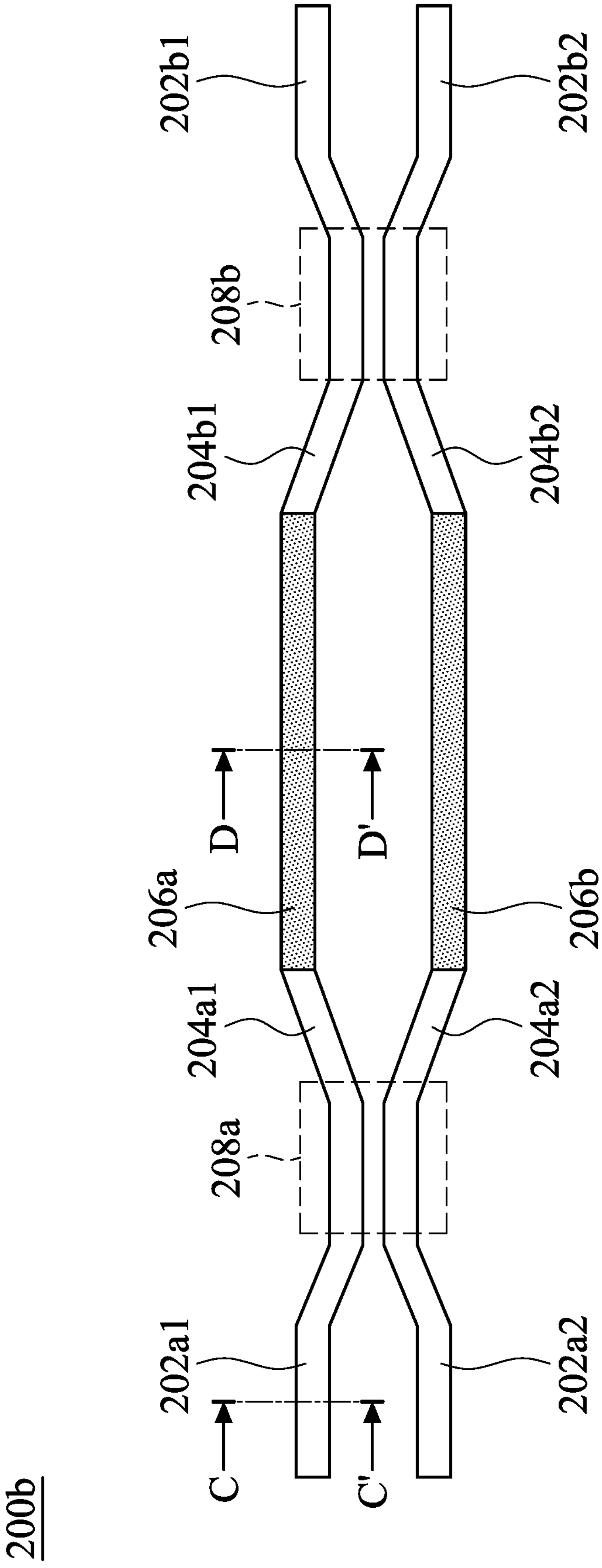
FIG. 2B is a top view of an optical switch that may be used in a photonic computing system.

FIG. 2B is a top view of an optical switch 200*b* that may be used in a photonic computing system. The cross-section C-C' indicates a vertical plane defining the vertical cross-sectional view shown in FIG. 2C. The optical switch 200*b* may include a first input waveguide 202*a*1, a second input waveguide 202*a*2, a first output waveguide 202*b*1, and a second output waveguide 202*b*2. Each of the first input waveguide 202*a*1, the second input waveguide 202*a*2, the first output waveguide 202*b*1, and the second output waveguide 202*b*2 may be configured to support single mode or multimode optical beams carrying optical signals. In an example embodiment, the optical switch 200*b* may be implemented as a Mach-Zehnder interferometer integrated with a first 50/50 beam splitter 208*a* and a second 50/50 beam splitter 208*b*. As shown in FIG. 2B, each of the first input waveguide 202*a*1 and the second input waveguide 202*a*2 may be optically coupled to the first 50/50 beam splitter 208*a* (also referred to as a directional coupler). The first 50/50 beam splitter 208*a* may receive a first optical signal from the first input waveguide 202*a*1 and a second input signal from the second input waveguide 202*a*2.

Through the phenomena of evanescent coupling, a first 50% of the first optical signal may be directed into the first waveguide segment 204*a*1 and a second 50% of the first optical signal may be directed to the second waveguide segment 204*a*2. Concurrently, a first 50% of the second optical signal may be directed into the first waveguide segment 204*a*1 and a second 50% of the second optical signal may be directed to the second waveguide segment 204*a*2. In this regard, the first optical signal and the second optical signal may be evenly split between the first waveguide segment 204*a*1 and the second waveguide segment 204*a*2.

The first modulator portion 206*a* and the second modulator portion 206*b* may receive signals from the first waveguide segment 204*a*1 and the second waveguide segment 204*a*2, respectively, and may act to adjust amplitudes and/or phases of the received signals. In this regard, each of the first modulator portion 206*a* and the second modulator portion 206*b* may include an electro-optic material having optical properties (e.g., index of refraction and absorption coefficient) that may vary as a function of an applied electrical bias. As such, in certain embodiments, phases of optical signals propagating with the first modulator portion 206*a* and the second modulator portion 206*b* may be controllably varied through application of pre-determined bias potentials.

After propagation through the first 50/50 beam splitter 208*a*, signals propagating in the first waveguide segment 204*a*1 and the second waveguide segment 204*a*2 may have a well-defined phase relationship (e.g., in-phase, 180° out-of-phase, etc.) relative to one another. As such, the first modulator portion 206*a* and the second modulator portion 206*b* may introduce a pre-determined phase difference between signals respectively received from the first waveguide segment 204*a*1 and the second waveguide segment 204*a*2. Signals propagating through the first modulator portion 206*a* may then be provided as output to a third waveguide segment 204*b*1 and signals propagating through the second modulator portion 206*b* may be provided as output to a fourth waveguide segment 204*b*2. Respective signals received from the third waveguide segment 204*b*1 and the fourth waveguide segment 204*b*2 may then be provided to the second 50/50 beam splitter 208*b*.

The second 50/50 beam splitter 208*b* may then act to send a first 50% of the signal received from the third waveguide segment 204*b*1 to the first output waveguide 202*b*1 and a second 50% of the signal received from the third waveguide segment 204*b*1 to the second output waveguide 202*b*2. Concurrently, a first 50% of the signal received from the fourth waveguide segment 204*b*2 may be sent to the first output waveguide 202*b*1 and a second 50% of the signal received from the fourth waveguide segment 204*b*2 may be sent to the second output waveguide 202*b*2.

The relative phase between the signals propagating in the third waveguide segment 204*b*1 and the fourth waveguide segment 204*b*2 may determine what signals appear in the first output waveguide 202*b*1 and the second output waveguide 202*b*2. Due to the phenomena of constructive and destructive interference, signals may be switched such that a signal only appears in the first output waveguide 202*b*1 (e.g., light beams may be in-phase) or in second output waveguide 202*b*2 (e.g., light beams may be out of phase). As such, by applying certain predetermined bias voltages to the first modulator portion 206*a* and the second modulator portion 206*b*, the optical switch 200*b* may provide switch functionality in that optical signals may be directed to either the first output waveguide 202*b*1 or to the second optical waveguide 202*b*2 as a function of bias voltages applied to the first modulator portion 206*a* and the second modulator portion 206*b*. Although both arms of the optical switch 200*b* (configured as a Mach-Zehnder interferometer in this example embodiment) are illustrated as including phase adjustment sections (i.e., the first modulator portion 206*a* and the second modulator portion 206*b*) other embodiments may include an optical switch 200*b* having a phase adjustment device in only a single arm.

Although a Mach-Zehnder interferometer implementation is illustrated in FIG. 2B as the optical switch 200*b*, embodiments may not be limited to this particular switch architecture. Various other phase adjustment devices may be included within the scope of this disclosure, including ring resonator designs, Mach-Zehnder modulators, generalized Mach-Zehnder modulators, etc. In some embodiments, optical phase shifter devices described herein may be utilized within a quantum computing system. Alternatively, such optical phase shifter devices may be used in other types of optical systems. For example, other computational, communication, and/or technological systems may utilize photonic phase shifters to direct optical signals (e.g., single photons or continuous wave (CW) optical signals) within a system or network, and phase shifter architectures described herein may be used within these systems, in various embodiments.

Figure 2C:
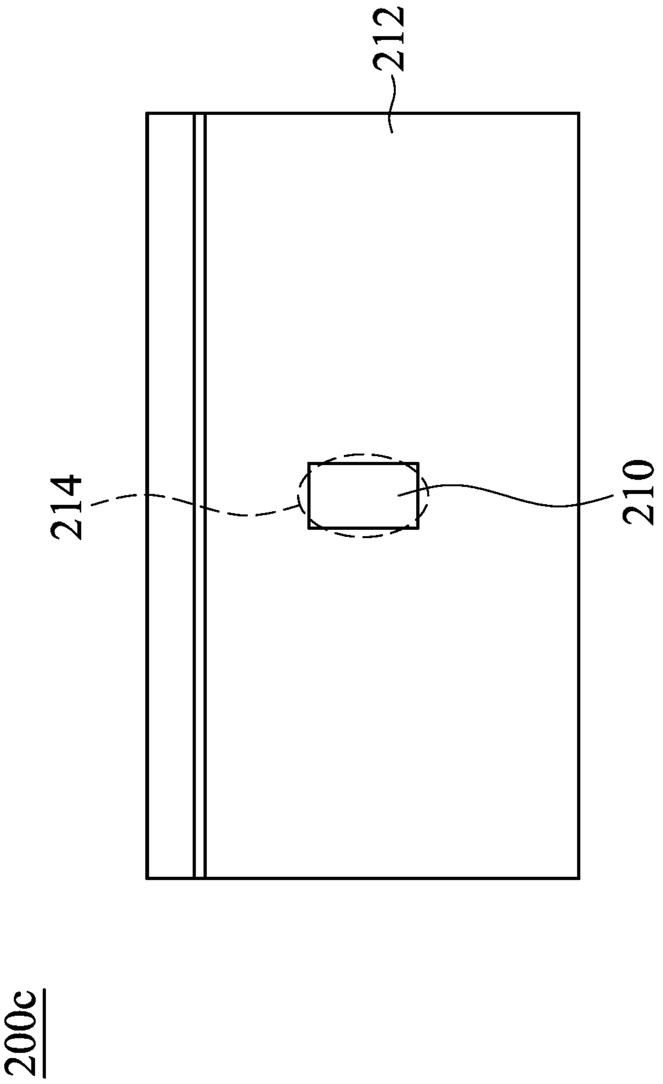
FIG. 2C is a vertical cross-sectional view of a silicon waveguide along a vertical plane C-C' in FIGS. 2A and 2B.

FIG. 2C is a vertical cross-sectional view of a dielectric (e.g., silicon/$SiO_2$) waveguide 200*c*. As mentioned above, the vertical plane defining the view illustrated in FIG. 2C is indicated by the cross-section C-C' in FIGS. 2A and 2B. The dielectric waveguide 200*c* may include a core portion 210 and a cladding portion 212. The core portion 210 and the cladding portion 212 may each be configured to be transparent to light of a particular wavelength (e.g., infrared radiation). The core portion 210 and the cladding portion 212 may be formed using semiconductor device fabrication processes, as described in greater detail below.

The core portion 210 may be configured to have a higher index of refraction than that of the cladding portion 212. For example, the core portion 210 may be formed of doped or undoped silicon (e.g., index of refraction 3.88) and the cladding portion 212 may be formed of silicon oxide (e.g., index of refraction 1.46). Light may preferentially propagate in the core portion 210 due to the phenomena of total internal reflection resulting from the higher index of refraction of the core portion 210 relative to the cladding portion 212. For example, an optical mode may propagate within the core portion 210 and may have an electric field distribution that is confined to a localized region 214 associated with the core portion 210. The specific shape of the core portion 210 shown in FIG. 2C is merely an example and the core portion 210 may have various other shapes in other applications.

Figure 3A:
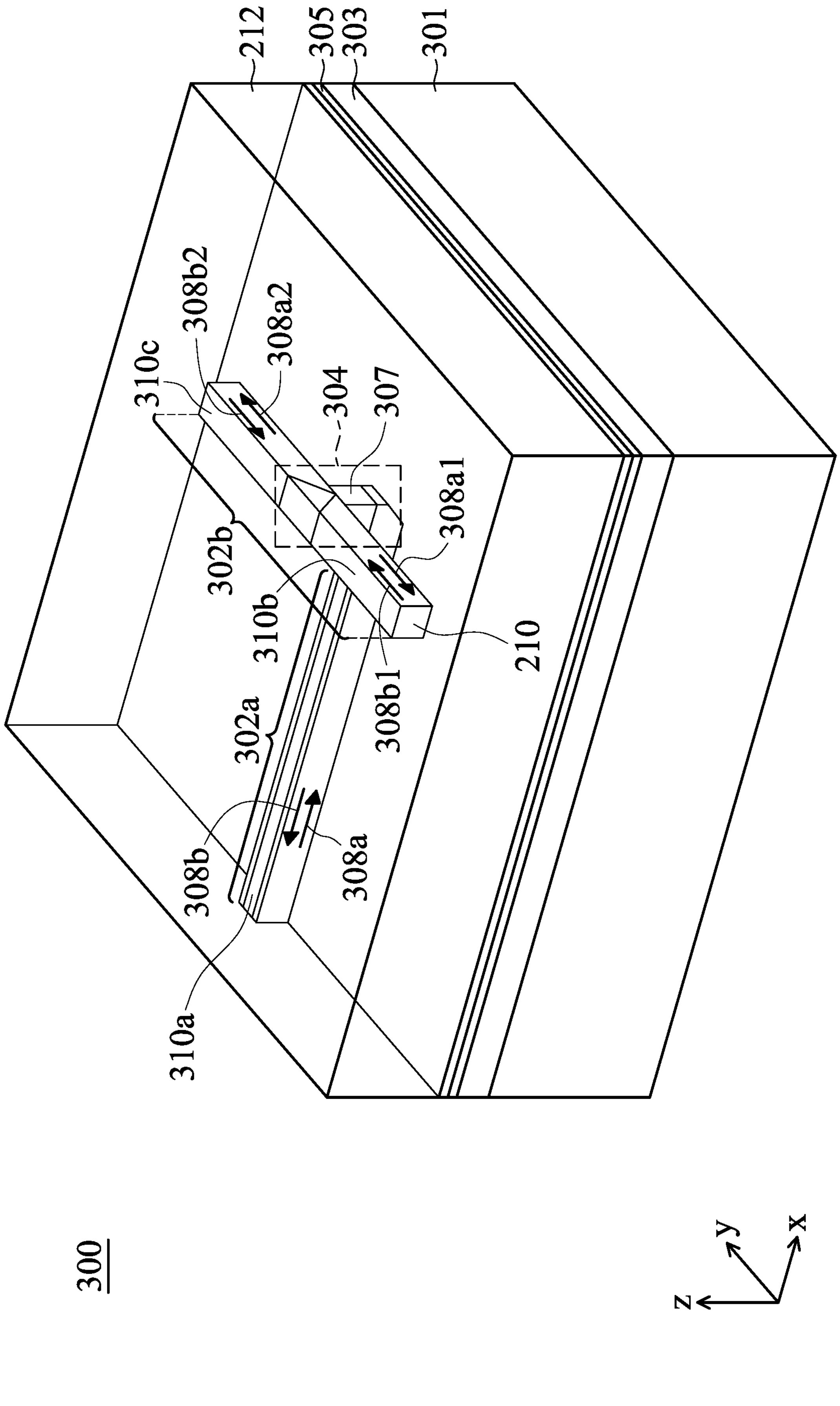
FIG. 3A is three-dimensional perspective view of a photonic device that includes three-dimensional photonic interconnects, according to various embodiments.

FIG. 3A is a three-dimensional perspective view of an embodiment photonic device 300 including three-dimensional photonic interconnects (302*a*, 302*b*), according to various embodiments. With reference to FIGS. 3A-3D, the photonic device 300 may include a first photonic interconnect 302*a* formed over a first horizontal plane 306*a* (e.g., see FIG. 3C) and a second photonic interconnect 302*b* formed over a second horizontal plane 306*b* (e.g., see FIG. 3C). As shown in FIG. 3C, the second horizontal plane 306*b* may be vertically displaced relative to the first horizontal plane 306*a*. The photonic device 300 may further include a photonic coupler 304 connected to the first photonic interconnect 302*a* and the second photonic interconnect 302*b*. The photonic coupler 304 may further include a photonic via 307 that connects the first photonic interconnect 302*a* to the second photonic interconnect 302*b* as described in greater detail with reference to FIG. 3C, below.

Each of the first photonic interconnect 302*a* and the second photonic interconnect 302*b* may be configured to allow propagation of an optical (i.e., photonic) mode. For example, each of the first photonic interconnect 302*a* and the second photonic interconnect 302*b* may be configured as a dielectric waveguide 200*c* (e.g., see FIG. 2C) having a core portion 210 that has a first dielectric constant surrounded by a cladding material 212 having a second dielectric constant that is less than the first dielectric constant.

The photonic device 300 may be formed using semiconductor manufacturing processes. For example, the photonic device 300 may be formed as part of a multi-layer structure including several material layers. For example, the multi-layer structure may include a silicon-on-insulator substrate including a silicon layer 301, and oxide layer 303 formed over the silicon layer 301, and a silicon device layer 305 formed over the oxide layer 303. The first photonic interconnect 302*a* and the second photonic interconnect 302*b* may be formed by deposition and patterning of various dielectric layers. For example, in various embodiments, each of the first photonic interconnect 302*a* and the second photonic interconnect 302*b* may be formed as silicon waveguides having a silicon core portion 210 surrounded by a silicon oxide cladding material 212. Various other materials may be used for the first photonic interconnect 302*a* and the second photonic interconnect 302*b* in other embodiments. For example, in various embodiments, the first photonic interconnect 302*a* and the second photonic interconnect 302*b* may each be formed of one of Si, SiN, LiNbO3, BaTiO3, a polymer material, etc.

Figure 3B:
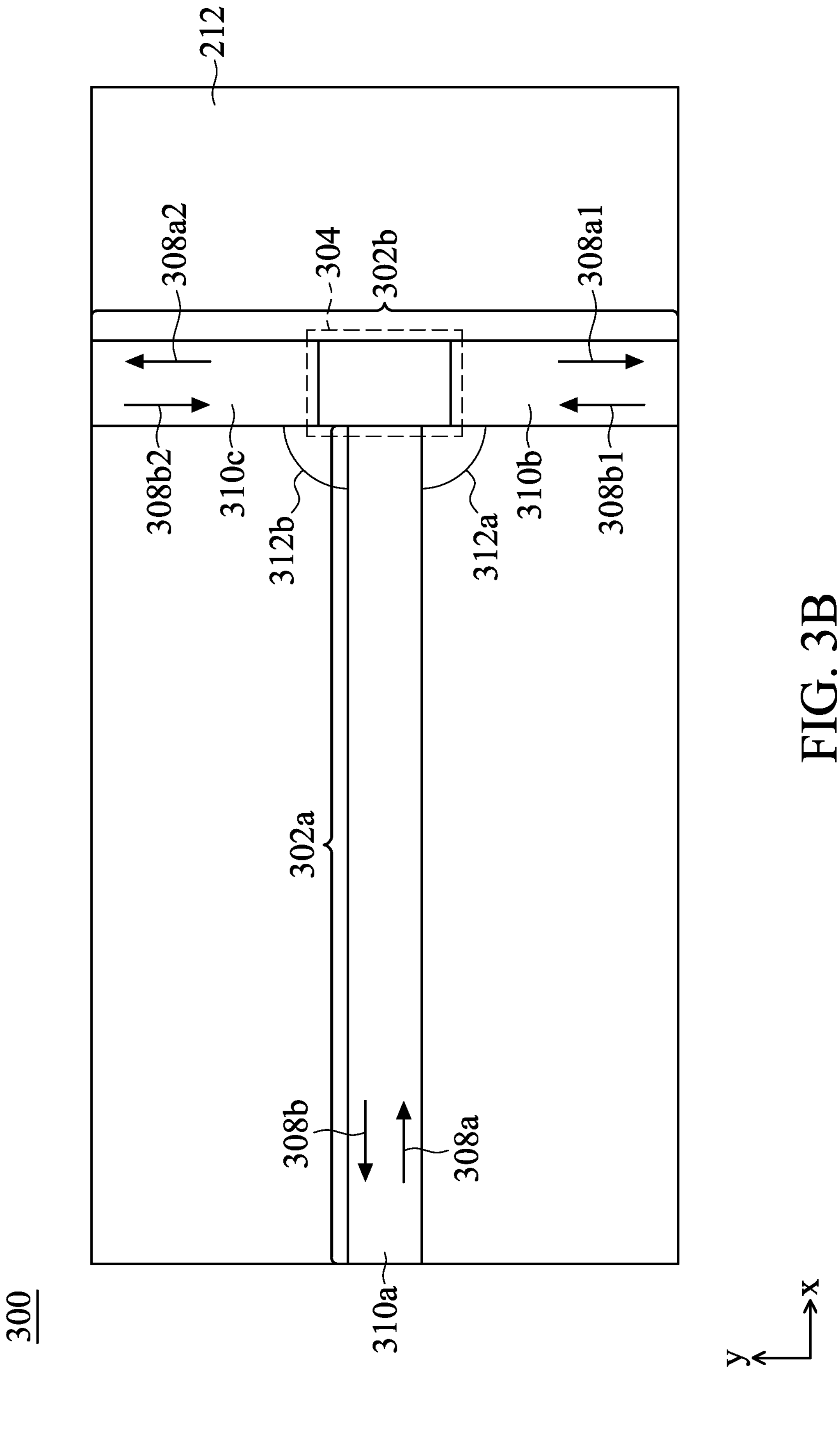
FIG. 3B is top view of the photonic device of FIG. 3A, according to various embodiments.
Figure 3C:
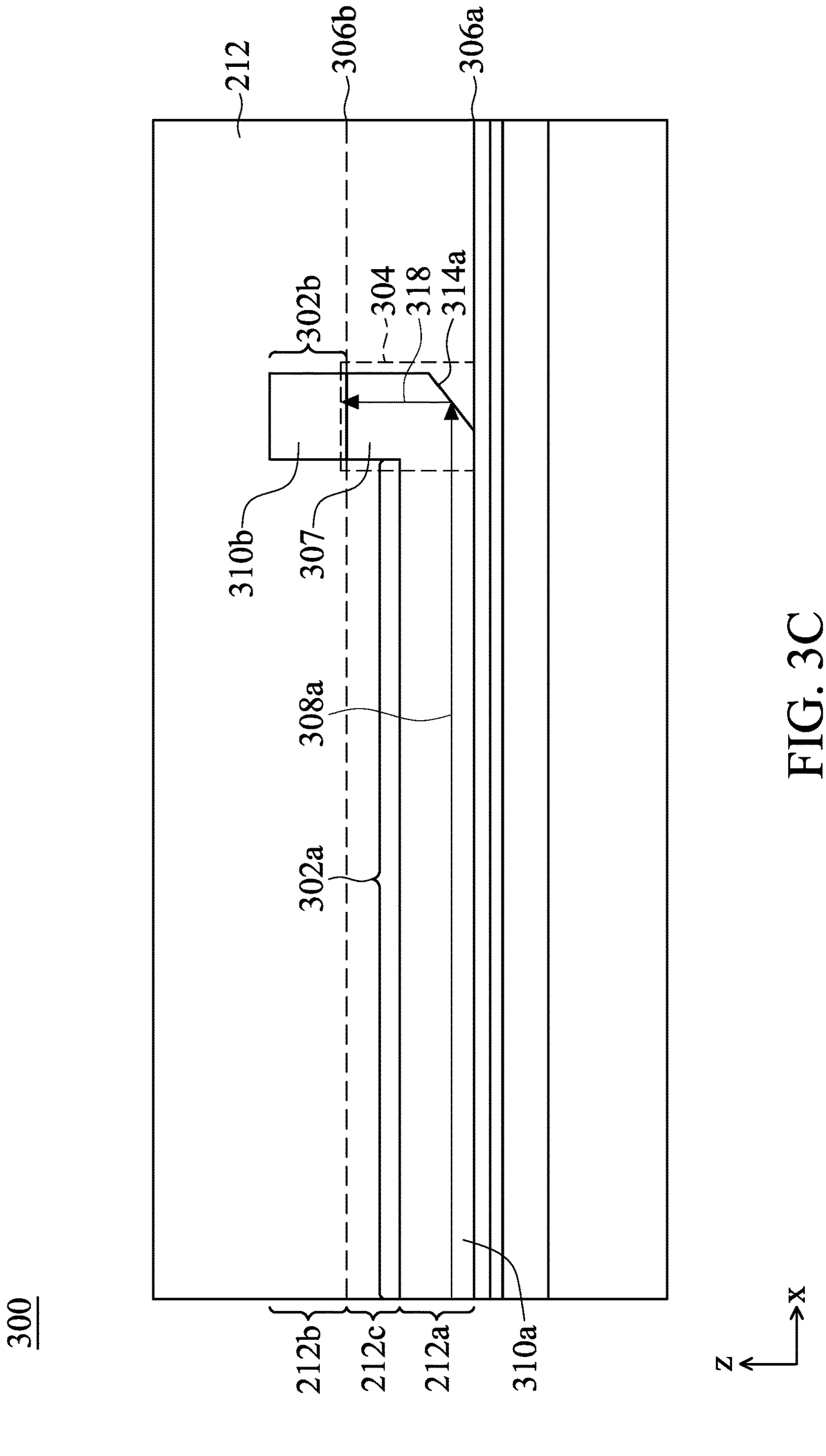
FIG. 3C is side view of the photonic device of FIG. 3A, according to various embodiments.

FIG. 3B is top view of the photonic device 300 of FIG. 3A, according to various embodiments. As shown in FIGS. 3A and 3B, the photonic coupler 304 may be configured such that first photonic signals 308*a* that are incident on the photonic coupler 304 from the first photonic interconnect 302*a* may be directed by the photonic coupler 304 into the second photonic interconnect 302*b*. Similarly, second photonic signals (308*b*1, 308*b*2) that are incident on the photonic coupler 304 from the second photonic interconnect 302*b* may be directed by the photonic coupler 304 into the first photonic interconnect 302*a*. In this regard, the photonic device 300 of FIGS. 3A and 3B may be configured as a beam splitter in which the first photonic signal 308*a* (i.e., an input signal) may be split into two output signals (308*a*1, 308*a*2). Similarly, the photonic device 300 may function as a beam combiner in which two input signals (308*b*1, 308*b*2) may be combined into a single output signal 308*b*. In this regard, the first photonic interconnect 302*a* may include a first photonic propagation path 310*a* (e.g., a first dielectric waveguide 200*c*) and the second photonic interconnect 302*b* may include a second photonic propagation path 310*b* (e.g., a second dielectric waveguide 200*c*) and a third photonic propagation path 310*c* (e.g., a third dielectric waveguide 200*c*).

Each of the first photonic interconnect 302*a* and the second photonic interconnect 302*b* may have various numbers of photonic propagation paths in other embodiments. For example, in other embodiments, the first photonic interconnect 302*a* may include a first photonic propagation path 310*a* and the second photonic interconnect 302*b* may include a single photonic propagation path 310*b*. Alternatively, the first photonic interconnect 302*a* may include two photonic propagation paths and the second photonic interconnect 302*b* may also have two photonic propagation paths, as described in greater detail with reference to FIGS. 4A to 4E, below. In further embodiments, the first photonic interconnect 302*a* may have a first number N of photonic propagation paths and the second photonic interconnect 302*b* may have a second number M of photonic propagation paths, where N=1, 2, 3 . . . , and M=1, 2, 3 . . . , may take integer values.

As shown in FIG. 3B, the first photonic propagation path 310*a* may be oriented along a first direction (e.g., along the positive x-axis), the second photonic propagation path 310*b* may be oriented along a second direction (e.g., along the negative y-axis), and the third photonic propagation path 310*c* may be oriented along a third direction (e.g., along the positive y-axis). As such, the second direction may be oriented at a first angle 312*a* relative to the first direction and the third direction may be oriented at a second angle 312*b* relative to the first direction. In the example embodiment photonic device 300 of FIG. 3B, each of the first angle 312*a* and the second angle 312*b* may have a value of 90°. In various other embodiments, however, each of the first angle 312*a* and the second angle 312*b* may take any value that is between 0° and 180°.

FIG. 3C is side view of the photonic device 300 of FIG. 3A, according to various embodiments. The illustration of FIG. 3C corresponds to viewing the photonic device 300 along the positive y-axis (e.g., see FIG. 3A). As shown, the first photonic interconnect 302*a* may be formed in a first layer 212*a* of the cladding material 212 and the second photonic interconnect 302*b* may be formed in a second layer 212*b* of the cladding material 212. Similarly, the photonic via 307 may be formed in a third layer 212*c* of the cladding material 212, as described in greater detail below. As further shown in FIG. 3C, the photonic coupler 304 may include a first angled reflector 314*a* that is configured to receive a first horizontally propagating photonic signal (i.e., the first photonic signal 308*a*) and to convert the first horizontally propagating photonic signal 308*a* into a vertically propagating photonic signal 318 that propagates within the photonic via 307.

As shown, the first angled reflector 314*a* may include a planar surface that is angled relative to the first direction (i.e., the x-direction) and a fourth direction (i.e., the z-direction). In various embodiments, the angled reflector 314*a* may be formed at an interface between the core portion 210 and the cladding material 212 and may act to reflect photonic signals due to the phenomena of total internal reflection. In other embodiments, the angled reflector 314*a* may further be formed of a metal layer (not shown) or a multi-layer dielectric structure (also not shown) including one of alternating Si/SiO2 layers, alternating SiN/SiO2 layers, or alternating Ta2O5/SiO2 layers. One or more additional angled reflectors (314*b*, 314*c*) may then convert the vertically propagating photonic signal 318 into one or more respective additional horizontally propagating photonic signals (308*a*1, 308*a*2) as described in greater detail with reference to FIG. 3D, below. In this regard, each of the additional angled reflectors (314*b*, 314*c*) may be a planar surface that is angled relative to the first direction (i.e., the x-direction) and the fourth direction (i.e., the z-direction) as shown in FIG. 3D.

Figure 3D:
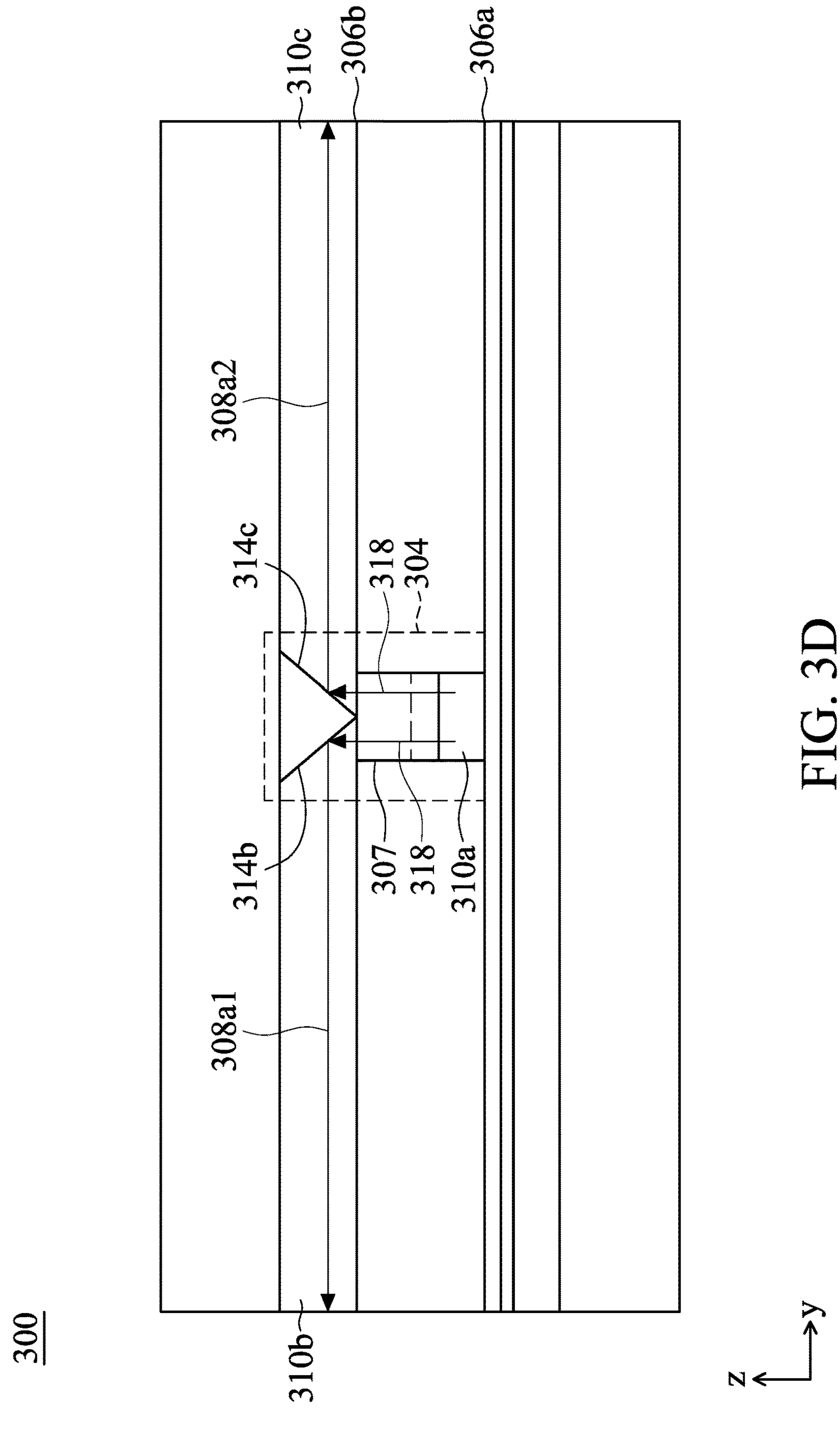
FIG. 3D is a further side view of the photonic device of FIG. 3A, according to various embodiments.

FIG. 3D is a further side view of the photonic device of FIG. 3A, according to various embodiments. The illustration of FIG. 3D corresponds to viewing the photonic device 300 along the negative x-axis (e.g., see FIG. 3A). As shown in FIG. 3D, the photonic coupler 304 may include a second angled reflector 314*b* that converts a first portion of the vertically propagating photonic signal 318 into a second horizontally propagating photonic signal (i.e., the first output signal 308*a*1) that may then be provided to the second photonic propagation path 310*b*. Similarly, the photonic coupler 304 may include a third angled reflector 314*c* that converts a second portion of the vertically propagating photonic signal 318 into a third horizontally propagating photonic signal (i.e., the second output signal 308*a*2) that may then be provided to the third photonic propagation path 310*c*.

In various embodiments, the angled reflectors (314*a*, 314*b*, 314*c*) may be formed at respective interfaces between the core portion 210 and the cladding material 212 and may act to reflect photonic signals due to the phenomena of total internal reflection. In other embodiments, one or more of the angled reflectors (314*a*, 314*b*, 314*c*) may further be formed of a metal layer (not shown) or a multi-layer dielectric structure (also not shown) including one of alternating $Si/SiO_2$ layers, alternating $SiN/SiO_2$ layers, or alternating $Ta_2O_5/SiO_2$ layers. Due to the geometry of the angled reflectors (314*a*, 314*b*, 314*c*), the photonic coupler 304 may also receive input signals (308*b*1, 308*b*2) from the second photonic interconnect 302*b* and may convert the input signals (308*b*1, 308*b*2) into a single output signal 308*b*, as described above with reference to FIG. 3B.

As illustrated in FIGS. 3C and 3D, the first horizontally propagating photonic signal 308*a* may be received from the first photonic propagation path 310*a* by the photonic coupler 304. The photonic coupler 304 may then convert the first horizontally propagating photonic signal 308*a* into the vertically propagating photonic signal 318, which may then be converted into the second horizontally propagating photonic signal 308*a*1 and the third horizontally propagating photonic signal 308*a*2. As shown in FIG. 3D, the second horizontally propagating photonic signal 308*a*1 may be provided by the photonic coupler 304 to the second photonic propagation path 310*b* and the third horizontally propagating photonic signal 308*a*2 may be provided by the photonic coupler 304 to the third photonic propagation path 310*c*. As such, the first horizontally propagating photonic signal 308*a* may be divided into two output signals (308*a*1, 308*a*2). Due to energy conservation, each of the output signals (308*a*1, 308*a*2) may have an intensity that is approximately half of an intensity of the input photonic signal 308*a*.

In certain embodiments, photonic coupler 304 may further include a photonic gain medium (not shown) that may act to increase respective intensities of the second horizontally propagating photonic signal 308*a*1 and the third horizontally propagating photonic signal 308*a*2. For example, the photonic coupler 304 may be formed of a dielectric material that may be doped with erbium or other material that may exhibit optical fluorescent properties. Similarly, one or more of the second photonic propagation path 310*b* and the third photonic propagation path 310*c* may include a photonic gain medium that may act to increase respective intensities of the second horizontally propagating photonic signal 308*a*1 and the third horizontally propagating photonic signal 308*a*2 in various embodiments.

Figure 4A:
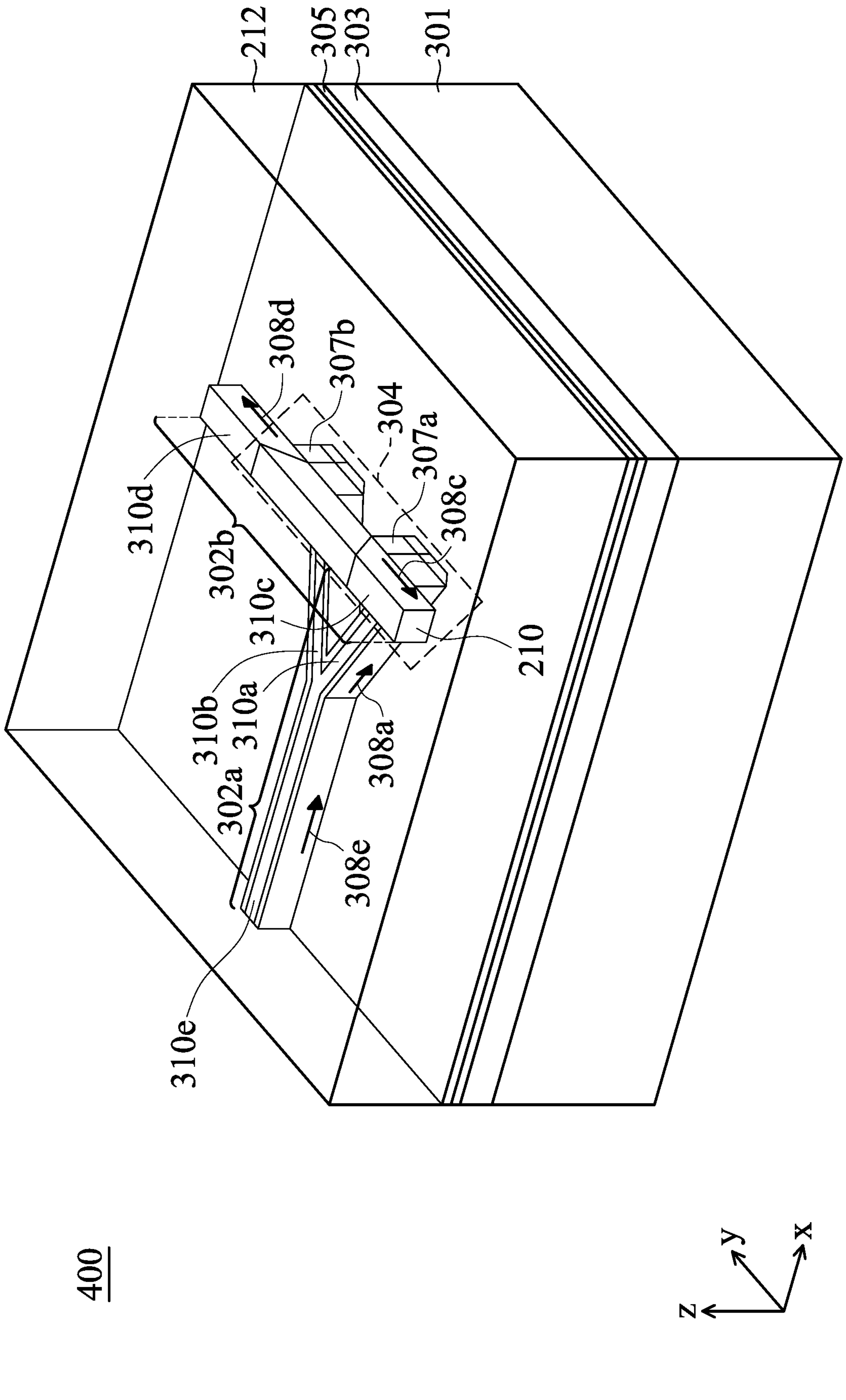
FIG. 4A is a three-dimensional perspective view of a further photonic device that includes three-dimensional photonic interconnects, according to various embodiments.

FIG. 4A is a three-dimensional perspective view of a further embodiment photonic device 400 including three-dimensional photonic interconnects (302*a*, 302*b*), according to various embodiments. With reference to FIGS. 4A-4D, the photonic device 400 may include a first photonic interconnect 302*a* formed over a first horizontal plane 306*a* (e.g., see FIG. 4C) and a second photonic interconnect 302*b* formed over a second horizontal plane 306*b* (e.g., see FIG. 4C). As shown in FIG. 4C, the second horizontal plane 306*b* may be vertically displaced relative to the first horizontal plane 306*a*. The photonic device 400 may further include a photonic coupler 304 connected to the first photonic interconnect 302*a* and the second photonic interconnect 302*b*.

The first photonic interconnect 302*a* may include a first photonic propagation path 310*a* and a second photonic propagation path 310*b* (e.g., see FIG. 4A). Similarly, the second photonic interconnect 302*b* may include a third photonic propagation path 310*c* and a fourth photonic propagation path 310*d*. The photonic coupler 304 may include a first photonic via 307*a*, which connects the first photonic propagation path 310*a* to the third photonic propagation path 310*c*, and a second photonic via 307*b*, which connects the second photonic propagation path 310*b* to the fourth photonic propagation path 310*d*.

Figure 4B:
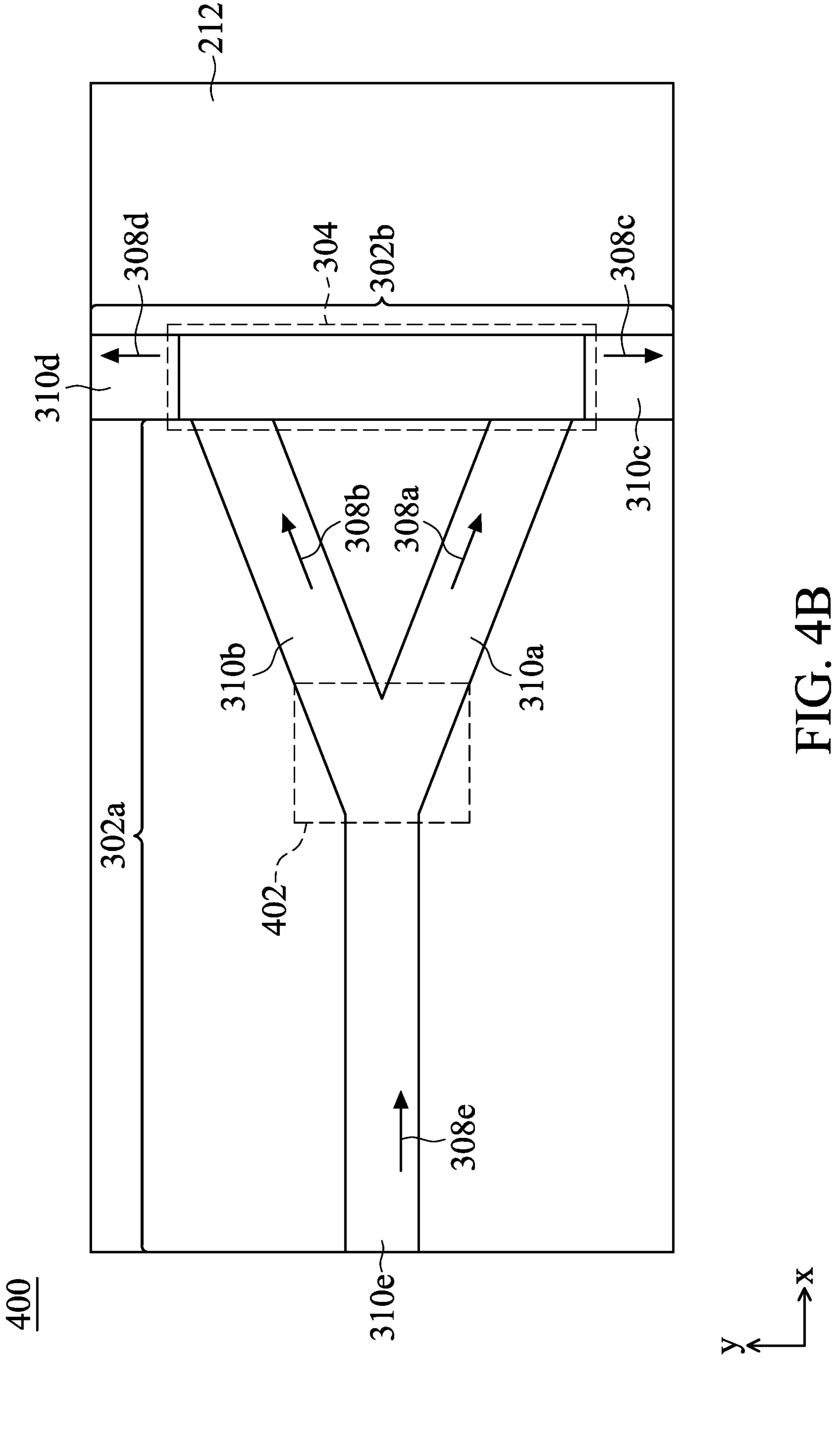
FIG. 4B is a top view of the photonic device of FIG. 4A, according to various embodiments.
Figure 4C:
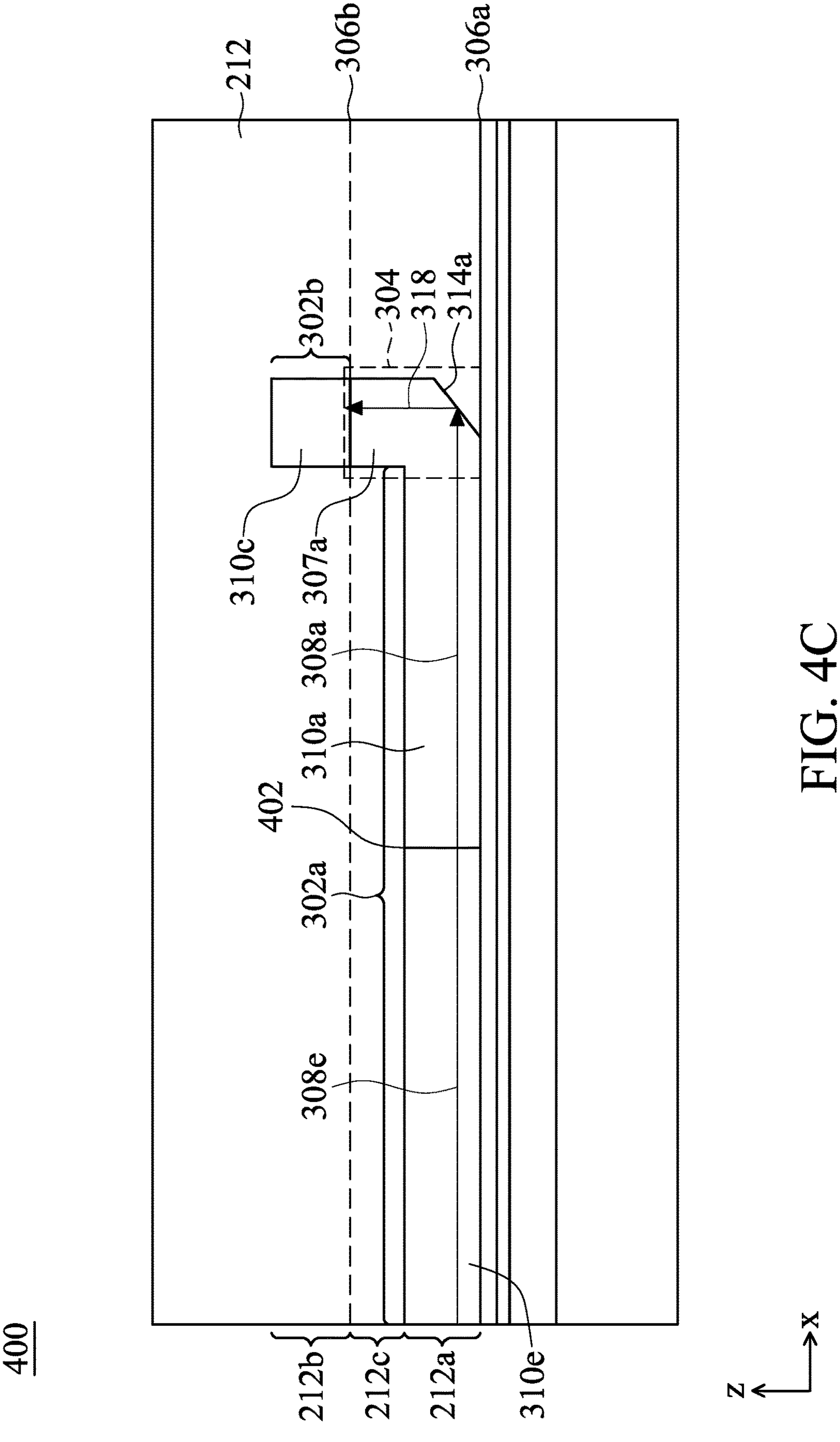
FIG. 4C is a side view of the photonic device of FIG. 4A, according to various embodiments.

FIG. 4B is top view of the photonic device 400 of FIG. 4A, according to various embodiments. As shown in FIGS. 4A and 4B, the photonic coupler 304 may be configured such that input photonic signals (308*a*, 308*b*) that are incident on the photonic coupler 304 from the first photonic interconnect 302*a* may be directed by the photonic coupler 304 into the second photonic interconnect 302*b* as output photonic signals (308*c*, 308*d*). As shown in FIG. 4B the first photonic interconnect 302*a* may further include a fifth photonic propagation path 310*e* connected to the first photonic propagation path 310*a* and the second photonic propagation path 310*b* at a junction 402. The junction 402 may be formed such that an input photonic signal 308*e* traveling within the fifth photonic propagation path 310*e* toward the junction 402 is split into a first photonic signal 308*a* propagating away from the junction 402 within the first photonic propagation path 310*a* and a second photonic signal 308*b* propagating away from the junction 402 within the second photonic propagation path 310*b*. As further shown in FIG. 4B, the first photonic signal 308*a* may be converted to a third photonic signal 308*c* propagating in the third propagation path 310*c* and the second photonic signal 308*b* may be converted to a fourth photonic signal 308*d* propagating in the fourth propagation path 310*d*.

FIG. 4C is side view of the photonic device 400 of FIG. 4A, according to various embodiments. The illustration of FIG. 4C corresponds to viewing the photonic device 400 along the positive y-axis (e.g., see FIG. 4A). As shown in FIG. 4C, the photonic coupler 304 may include a first angled reflector 314*a* that is configured to receive a first horizontally propagating photonic signal (i.e., the first photonic signal 308*a*) and to convert the first horizontally propagating photonic signal 308*a* into a vertically propagating photonic signal 318 that propagates within the first photonic via 307*a*. One or more additional angled reflectors (314*b*, 314*c* in FIG. 4D) may then convert the vertically propagating photonic signal 318 into one or more respective additional horizontally propagating photonic signals (308*c*, 308*d*) as described in greater detail with reference to FIG. 4D, below.

Figure 4D:
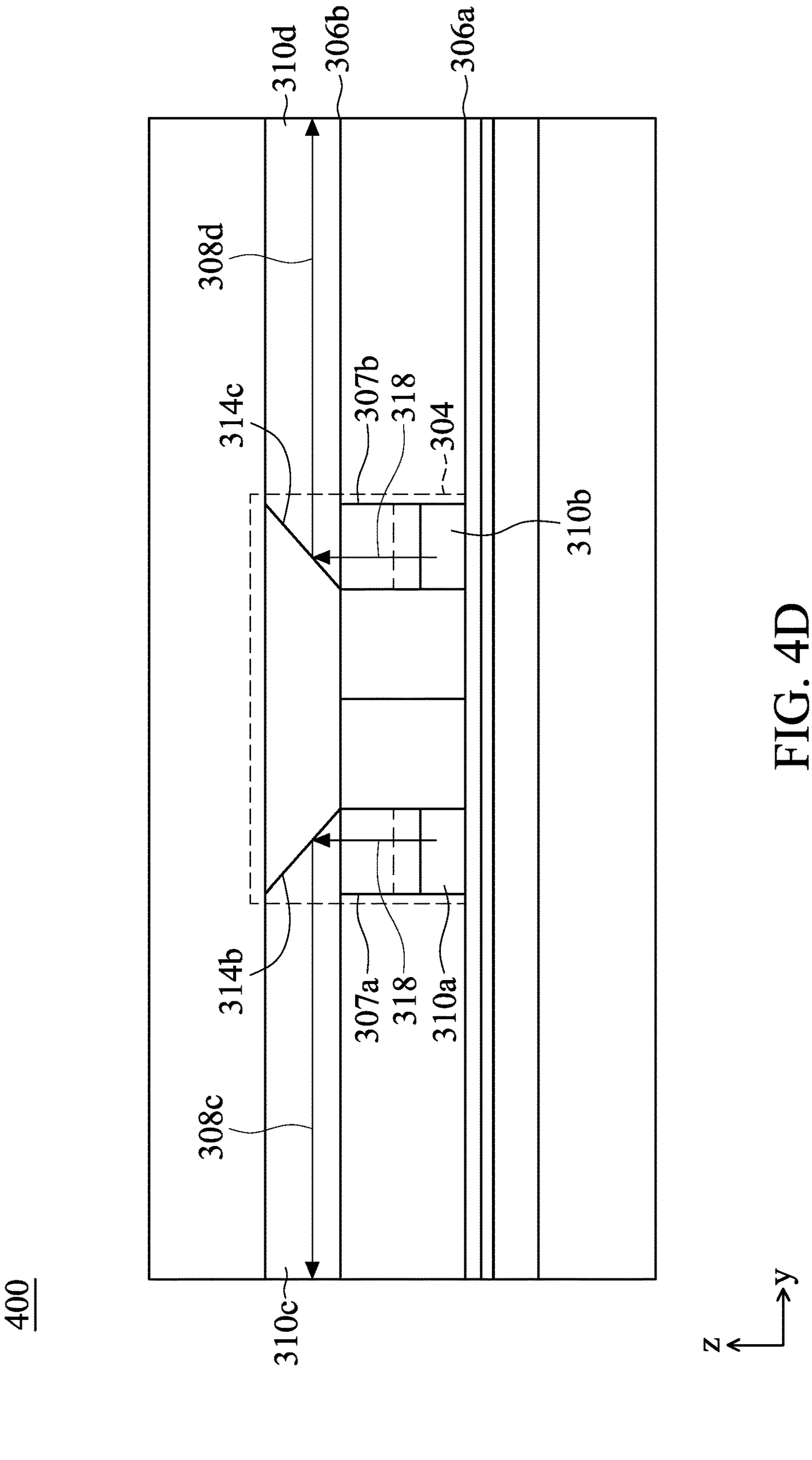
FIG. 4D is a further side view of the photonic device of FIG. 4A, according to various embodiments.

FIG. 4D is a further side view of the photonic device 400 of FIG. 4A, according to various embodiments. The illustration of FIG. 4D corresponds to viewing the photonic device 400 along the negative x-axis (e.g., see FIG. 4A). As shown in FIG. 4D, the photonic coupler 304 may include a second angled reflector 314*b* that may convert a first portion of the vertically propagating photonic signal 318 into a third horizontally propagating photonic signal (i.e., the first output signal 308*c*) that may then be provided to the third photonic propagation path 310*c*. Similarly, the photonic coupler 304 may include a third angled reflector 314*c* that may convert a second portion of the vertically propagating photonic signal 318 into a third horizontally propagating photonic signal (i.e., the second output signal 308*d*) that may then be provided to the third photonic propagation path 310*c*. In this regard, the photonic coupler includes a first photonic via 307*a* and a second photonic via 307*b* (e.g., see FIG. 4A). Just as the first photonic signal 308*a* is converted to a vertically propagating photonic signal 318 by the first angled reflector 314*a*, a similar vertically propagating photonic signal 318 may be generated from the second photonic signal 308*b* by the second photonic via 307*b* using an angled reflector (not shown) similar to the first angled reflector 314*a*.

In various embodiments, the angled reflectors (314*a*, 314*b*, 314*c*) may be formed at respective interfaces between the core portion 210 and the cladding material 212 (e.g., see FIG. 4A) and may act to reflect photonic signals due to the phenomena of total internal reflection. In other embodiments, one or more of the angled reflectors (314*a*, 314*b*, 314*c*) may further be formed of a metal layer (not shown) or a multi-layer dielectric structure (also not shown) including one of alternating $Si/SiO_2$ layers, alternating $SiN/SiO_2$ layers, or alternating $Ta_2O_5/SiO_2$ layers. As with other embodiments, described above, the first photonic propagation path 310*a*, the second photonic propagation path 310*b*, the third photonic propagation path 310*c*, the fourth photonic propagation path 310*d*, and the fifth propagation path 310*e*, may each be formed as a dielectric waveguide 200*c* (e.g., see FIG. 2C) having a core portion 210, having a first dielectric constant, surrounded by a cladding material 212 having a second dielectric constant that is less than the first dielectric constant.

In further embodiments, the photonic device 400 may include a photonic gain medium (not shown) located in the first photonic propagation path 310*a* and the second photonic propagation path 310*b* such that the photonic gain medium increases respective intensities of the first photonic signal 308*a* and the second photonic signal 308*b*. For example, the first photonic propagation path 310*a* and the second photonic propagation path 310*b* may be formed of a dielectric material that may be doped with erbium or other material that may exhibit optical fluorescent properties. In other embodiments, one or both of the first photonic via 307*a* and the second photonic via 307*b* may include a photonic gain medium.

The above-described embodiments include three-dimensional photonic interconnects (302*a*, 302*b*) that are formed as a multi-layer structure. In this regard, the photonic device 300 of FIGS. 3A to 3C may include a first photonic waveguide 310*a* formed within a first layer 212*a* of a cladding material 212 (e.g., see FIG. 3C). The first photonic waveguide 310*a* may have a first dielectric constant and the cladding material 212 may have a second dielectric constant that is less than the first dielectric constant. The photonic device 300 may further include a second photonic waveguide 310*b* formed within a second layer 212*b* of the cladding material 212. According to various embodiments, the second photonic waveguide 310*b* may have the first dielectric constant. As shown in FIG. 3C, for example, the second layer 212*b* of the cladding material 212 is vertically displaced relative to the first layer 212*a* of the cladding material 212. In this regard, the first layer 212*a* of the cladding material 212 may be formed over the first horizontal plane 306*a* and the second layer 212*b* of the cladding material 212 may be formed over the second horizontal plane 306*b*.

The photonic device 300 may further include a photonic via 307 formed within a third layer 212*c* of the cladding material 212. As shown in FIG. 3C, the third layer 212*c* of the cladding material 212 may separate the first layer 212*a* of the cladding material 212 and the second layer 212*b* of the cladding material 212. Further, as shown in FIG. 3A, the photonic via 307 photonically couples the first photonic waveguide 310*a* and the second photonic waveguide 310*b*. The photonic device 300 may further include a first angled reflector 314*a* (e.g., see FIG. 3C) that connects the first photonic waveguide 310*a* to the photonic via 307 and a second angled reflector 314*b* (e.g., see FIG. 3D) that connects the photonic via 307 to the second photonic waveguide 310*b*.

As shown in FIGS. 3C and 3D, the first angled reflector 314*a* may be configured to receive a first photonic signal 308*a* from the first photonic waveguide 310*a* and to convert the first photonic signal 308*a* into a vertically propagating photonic signal 318 within the photonic via 307. The second angled reflector 314*b* may be configured to receive the vertically propagating photonic signal 318 from the photonic via 307 and to convert the vertically propagating photonic signal 318 into a second photonic signal 308*a*1 that is provided to the second photonic waveguide 310*b*. In some embodiments, each of first angled reflector 314*a* and the second angled reflector 314*b* may include a metal layer (not shown) or a multi-layer dielectric structure (also not shown) having one of alternating $Si/SiO_2$ layers, alternating $SiN/SiO_2$ layers, or alternating $Ta_2O_5/SiO_2$ layers.

Referring to all drawings and according to various embodiments of the present disclosure, a photonic device 300 is provided. The photonic device 300 may include a first photonic interconnect 302*a* formed along a first direction (e.g., along the positive x-axis) over a first horizontal plane 306*a* and a second photonic interconnect 302*b* formed along a second direction (e.g., along the negative y-axis) over a second horizontal plane 306*b* that is vertically displaced relative to the first horizontal plane 306*a*, such that the first direction and the second direction are non-parallel. The photonic device 300 may further include a photonic coupler 304 connected to the first photonic interconnect 302*a* and the second photonic interconnect 302*b*. The photonic device 300 may be configured such that first photonic signals 308*a* that are incident on the photonic coupler 304 from the first photonic interconnect 302*a* are directed by the photonic coupler 304 into the second photonic interconnect 302*b* (e.g., as output signals 308*a*1 and 308*a*2). Further, the photonic device 300 may be configured such that second photonic signals (308*b*1, 308*b*2) that are incident on the photonic coupler 304 from the second photonic interconnect 302*b* are directed by the photonic coupler 304 into the first photonic interconnect 302*a* (e.g., as a single output signal 308*b*).

The photonic device 300 may further include a first angled reflector 314*a* (e.g., see FIG. 3C) that receives a first horizontally propagating photonic signal 308*a* and converts the first horizontally propagating photonic signal 308*a* into a vertically propagating photonic signal 318. The photonic device 300 may further include a second angled reflector 314*b* (e.g., see FIG. 3D) that converts the vertically propagating photonic signal 318 into a second horizontally propagating photonic signal 308*a*1. The first photonic interconnect 302*a* may include a first photonic propagation path 310*a* and the second photonic interconnect 302*b* may include a second photonic propagation path 310*b*. The first horizontally propagating photonic signal 308*a* may be received from the first photonic propagation path 310*a* by the photonic coupler 304 and the second horizontally propagating photonic signal 308*a*1 may be provided by the photonic coupler 304 to the second photonic propagation path 310*b*.

As shown in FIG. 3B, for example, the first photonic propagation path 310*a* may be oriented along the first direction (e.g., along the positive x-axis) and the second photonic propagation path 310*b* may be oriented along the second direction (e.g., along the negative y-axis). In various embodiments, the second direction may be oriented at a first angle that is between 0° and 180° relative to the first direction. The second photonic interconnect 302*b* further may include a third photonic propagation path 310*c* and the photonic coupler 304 further may include a third angled reflector 314*c*. As shown in FIG. 3D, for example, the third angled reflector 314*c* may convert a portion of the vertically propagating photonic signal 318 into a third horizontally propagating photonic signal 308*a*2 that may be provided to the third photonic propagation path 310*c*. In this regard, the first horizontally propagating photonic signal 308*a* may be split into the second horizontally propagating photonic signal 308*a*1 and the third horizontally propagating photonic signal 308*a*2.

As described above (e.g., see FIG. 3B) the first photonic propagation path 310*a* may be oriented along the first direction (e.g., along the positive x-axis), the second photonic propagation path 310*b* may be oriented along the second direction (e.g., along the negative y-axis), and the third photonic propagation path 310*c* may be oriented along a third direction (e.g., along the positive y-axis). As such, the second direction may be oriented at a first angle 312*a* that is approximately 90° and third direction may be oriented at a second angle 312*b* that is approximately 90°. In various other embodiments, the second direction may be oriented at a first angle 312*a* that is between 0° and 180° relative to the first direction and the third direction may be oriented at a second angle 312*b* that is between 0° and 180° relative to the first direction. In certain embodiments, the photonic coupler 304 further may include a photonic gain medium (not shown) that increases respective intensities of the second horizontally propagating photonic signal 308*a*1 and the third horizontally propagating photonic signal 308*a*2. In further embodiments, the first angled reflector 314*a* and the second angled reflector 314*b* may each include a metal layer or a multi-layer dielectric structure including one of alternating $Si/SiO_2$ layers, alternating $SiN/SiO_2$ layers, or alternating $Ta_2O_5/SiO_2$ layers.

As shown in FIGS. 3A to 3D, the photonic coupler 304 further may include a photonic via 307 that connects the first photonic interconnect 302*a* to the second photonic interconnect 302*b* such that the vertically propagating photonic signal 318 may be located within the photonic via 307. In various embodiments, the first photonic interconnect 302*a* and the second photonic interconnect 302*b* may each be formed as a dielectric waveguide (e.g., a silicon waveguide 200*c*) having a core portion 210, having a first dielectric constant, surrounded by a cladding material 212 having a second dielectric constant that may be less than the first dielectric constant. In various embodiments, the first photonic interconnect 302*a* and the second photonic interconnect 302*b* may be formed as silicon waveguides 200*c* having a silicon core portion 210 surrounded by a silicon oxide cladding material 212. In further embodiments, the first photonic interconnect 302*a* and the second photonic interconnect 302*b* may each be formed of one of Si, SiN, $LiNbO_3$, $BaTiO_3$, or a polymer material.

As illustrated in FIG. 4A, for example, a further photonic device 400 may include a first photonic interconnect 302*a* having a first photonic propagation path 310*a* and a second photonic propagation path 310*b*, a second photonic interconnect 302*b* having a third photonic propagation path 310*c* and a fourth photonic propagation path 310*d*, and a photonic coupler 304. The photonic coupler 304 may include a first photonic via 307*a* that connects the first photonic propagation path 310*a* to the third photonic propagation path 310*c* and a second photonic via 307*b* that connects the second photonic propagation path 310*b* to the fourth photonic propagation path 310*d*. The photonic coupler 304 may also include a first angled reflector 314*a* connecting the first photonic propagation path 310*a* and the first photonic via 307*a* and a second angled reflector 314*b* connecting the first photonic via 307*a* to the third photonic propagation path 310*c*. As further illustrated in FIG. 4C, the first photonic interconnect 302*a* may be formed over a first horizontal plane 306*a* and the second photonic interconnect 302*b* may be formed over a second horizontal plane 306*b* that may be vertically displaced relative to the first horizontal plane 306*a*.

According to various embodiments (e.g., see FIGS. 4A to 4C) the first photonic interconnect 302*a* may further include a fifth photonic propagation path 310*e* connected to the first photonic propagation path 310*a* and the second photonic propagation path 310*b* at a junction 402 such that an input photonic signal 308*e* propagating within the fifth photonic propagation path 310*e* toward the junction 402 may be split into a first photonic signal 308*a* propagating away from the junction 402 within the first photonic propagation path 310*a* and a second photonic signal 308*b* propagating away from the junction 402 within the second photonic propagation path 310*b* (e.g., see FIG. 4B).

In further embodiments, the photonic device 400 may include a photonic gain medium (not shown) located in the first photonic propagation path 310*a* and the second photonic propagation path 310*b* such that the photonic gain medium increases respective intensities of the first photonic signal 308*a* and the second photonic signal 308*b*. According to various embodiments, the first photonic propagation path 310*a*, the second photonic propagation path 310*b*, the third photonic propagation path 310*c*, and the fourth photonic propagation path 310*d* may each be formed as a dielectric waveguide (e.g., a silicon waveguide 200*c*) having a core portion 210, having a first dielectric constant, surrounded by a cladding material 212 having a second dielectric constant that is less than the first dielectric constant.

According to further embodiments, a photonic device 300 may include a first photonic waveguide 310*a*, having a first dielectric constant, formed within a first layer 212*a* of a cladding material 212, having a second dielectric constant, which may be less than the first dielectric constant (e.g., see FIG. 3C). The photonic device 300 may include a second photonic waveguide 310*b*, having the first dielectric constant, formed within a second layer 212*b* of the cladding material 212. As shown in FIG. 3C, the second layer 212*b* of the cladding material 212 may be vertically displaced relative to the first layer 212*a* of the cladding material 212. The photonic device 300 may further include a photonic via 307 formed within a third layer 212*c* of the cladding material 212 separating the first layer 212*a* of the cladding material 212 and the second layer 212*b* of the cladding material 212. Further, the photonic via 307 may photonically couple the first photonic waveguide 310*a* and the second photonic waveguide 310*b*.

The photonic device 300 may further include a first angled reflector 314*a* (e.g., see FIG. 3C) that connects the first photonic waveguide 310*a* to the photonic via 307 and a second angled reflector 314*b* (e.g., see FIG. 3D) that connects the photonic via 307 to the second photonic waveguide 310*b*. As shown in FIGS. 3C and 3D, the first angled reflector 314*a* may be configured to receive a first photonic signal 308*a* from the first photonic waveguide 310*a* and to convert the first photonic signal 308*a* into a vertically propagating photonic signal 318 within the photonic via 307. The second angled reflector 314*b* may be configured to receive the vertically propagating photonic signal 318 from the photonic via 307 and to convert the vertically propagating photonic signal 318 into a second photonic signal 308*a*1 that is provided to the second photonic waveguide 310*b*. In some embodiments, each of first angled reflector 314*a* and the second angled reflector 314*b* may include a metal layer (not shown) or a multi-layer dielectric structure (also not shown) having one of alternating $Si/SiO_2$ layers, alternating $SiN/SiO_2$ layers, or alternating $Ta_2O_5/SiO_2$ layers.

Various embodiments disclosed herein may be advantageous by providing multi-directional, three-dimensional (3D), photonic interconnects. Such 3D photonic interconnects may allow photonic integrated circuits to be formed that have an increased integration density and may provide smaller devices with reduced optical insertion loss relative to systems that do not utilize 3D photonic interconnects.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonic device, comprising:

a first photonic interconnect formed over a first horizontal plane;

a second photonic interconnect formed over a second horizontal plane that is vertically displaced relative to the first horizontal plane; and a photonic coupler connected to the first photonic interconnect and the second photonic interconnect such that:

first photonic signals that are incident on the photonic coupler from the first photonic interconnect are directed by the photonic coupler into the second photonic interconnect; and second photonic signals that are incident on the photonic coupler from the second photonic interconnect are directed by the photonic coupler into the first photonic interconnect, wherein the photonic coupler comprises a photonic via that connects the first photonic interconnect to the second photonic interconnect, a first angled reflector configured to redirect a horizontally propagating photonic signal from the first photonic interconnect into a vertically propagating photonic signal within the photonic via, and a second angled reflector configured to redirect the vertically propagating photonic signal within the photonic via into a horizontally propagating photonic signal in the second photonic interconnect, wherein the photonic coupler further comprises a photonic gain medium configured to increase an intensity of the horizontally propagating photonic signal in the second photonic interconnect.

2. The photonic device of claim 1, wherein:

the first photonic interconnect comprises a first photonic propagation path and the second photonic interconnect comprises a second photonic propagation path;

the first horizontally propagating photonic signal is received from the first photonic propagation path by the photonic coupler; and the second horizontally propagating photonic signal is provided by the photonic coupler to the second photonic propagation path.

3. The photonic device of claim 2, wherein:

the second photonic interconnect further comprises a third photonic propagation path; and the photonic coupler further comprises a third angled reflector that converts a portion of the vertically propagating photonic signal into a third horizontally propagating photonic signal that is provided to the third photonic propagation path such that the first horizontally propagating photonic signal is split into the second horizontally propagating photonic signal and the third horizontally propagating photonic signal.

4. The photonic device of claim 1, wherein the first angled reflector and the second angled reflector each comprise a metal layer or a multi-layer dielectric structure comprising one of alternating $Si/SiO_2$ layers, alternating $SiN/SiO_2$ layers, or alternating $Ta_2O_5/SiO_2$ layers.

5. The photonic device of claim 1, wherein the first photonic interconnect and the second photonic interconnect are each formed as a dielectric waveguide having a core portion comprising a first dielectric constant surrounded by a cladding material having a second dielectric constant that is less than the first dielectric constant.

6. The photonic device of claim 5, wherein the first photonic interconnect and the second photonic interconnect are formed as silicon waveguides having a silicon core portion surrounded by a silicon oxide cladding material.

7. The photonic device of claim 1, wherein the first photonic interconnect and the second photonic interconnect are each formed of one of Si, SiN, $LiNbO_3$, $BaTiO_3$, or a polymer material.

8. The photonic device of claim 1, wherein:

the first photonic interconnect comprises a first photonic propagation path and a second photonic propagation path;

the second photonic interconnect comprises a third photonic propagation path and a fourth photonic propagation path;

the photonic coupler comprises a first photonic via that connects the first photonic propagation path to the third photonic propagation path; and the photonic coupler further comprises a second photonic via that connects the second photonic propagation path to the fourth photonic propagation path.

9. The photonic device of claim 1, wherein the first angled reflector and the second angled reflector are each formed at an interface between a core portion and the cladding material and are configured to reflect photonic signals due to total internal reflection.

10. The photonic device of claim 1, wherein the photonic device is formed as part of a multi-layer structure on a silicon-on-insulator substrate comprising a silicon layer, an oxide layer formed over the silicon layer, and a silicon device layer formed over the oxide layer.

11. The photonic device of claim 1, wherein the photonic via is formed of a dielectric material doped with erbium.

12. The photonic device of claim 1, wherein the first angled reflector comprises a planar surface that is angled relative to a horizontal direction and a vertical direction.

13. A photonic device, comprising:

a first photonic interconnect comprising a first photonic propagation path and a second photonic propagation path, wherein the first photonic interconnect is formed over a first horizontal plane;

a second photonic interconnect comprising a third photonic propagation path and a fourth photonic propagation path, wherein the second photonic interconnect is formed over a second horizontal plane that is vertically displaced relative to the first horizontal plane; and a photonic coupler comprising:

a first photonic via that connects the first photonic propagation path to the third photonic propagation path;

a second photonic via that connects the second photonic propagation path to the fourth photonic propagation path;

a first angled reflector connecting the first photonic propagation path and the first photonic via; and a second angled reflector connecting the first photonic via to the third photonic propagation path, wherein the first photonic interconnect further comprises a fifth photonic propagation path connected to the first photonic propagation path and the second photonic propagation path at a junction such that an input photonic signal traveling within the fifth photonic propagation path toward the junction is split into a first portion propagating in the first photonic propagation path and a second portion propagating in the second photonic propagation path.

14. The photonic device of claim 13, wherein the fifth photonic propagation path connected to the first photonic propagation path and the second photonic propagation path at the junction such that the input photonic signal traveling within the fifth photonic propagation path toward the junction is split into the first photonic signal propagating away from the junction within the first photonic propagation path and the second photonic signal propagating away from the junction within the second photonic propagation path, wherein the first photonic signal is converted by the photonic coupler to a third photonic signal propagating in the third photonic propagation path and the second photonic signal is converted by the photonic coupler to a fourth photonic signal propagating in the fourth photonic propagation path.

15. The photonic device of claim 14, further comprising:

a photonic gain medium located in the first photonic propagation path and the second photonic propagation path such that the photonic gain medium increases respective intensities of the first photonic signal and the second photonic signal.

16. The photonic device of claim 13, wherein the first photonic propagation path, the second photonic propagation path, the third photonic propagation path, and the fourth photonic propagation path are each formed as a dielectric waveguide having a core portion comprising a first dielectric constant surrounded by a cladding material having a second dielectric constant that is less than the first dielectric constant.

17. The photonic device of claim 13, wherein at least one of the first photonic via and the second photonic via includes a photonic gain medium.

18. A photonic device, comprising:

a first photonic waveguide having a first dielectric constant formed within a first layer of a cladding material having a second dielectric constant that is less than the first dielectric constant;

a second photonic waveguide having the first dielectric constant formed within a second layer of the cladding material having the second dielectric constant that is less than the first dielectric constant, wherein the second layer of the cladding material is vertically displaced relative to the first layer of the cladding material; and a photonic via formed within a third layer of the cladding material separating the first layer of the cladding material and the second layer of the cladding material, wherein the photonic via photonically couples the first photonic waveguide and the second photonic waveguide, the photonic device further comprising a first angled reflector configured to convert a first horizontally propagating photonic signal in the first photonic waveguide into a vertically propagating photonic signal within the photonic via, and a second angled reflector configured to convert the vertically propagating photonic signal into a second horizontally propagating photonic signal in the second photonic waveguide, wherein the photonic device is configured as a beam splitter such that the first horizontally propagating photonic signal is split into the second horizontally propagating photonic signal and a third horizontally propagating photonic signal in the second photonic waveguide, or as a beam combiner such that two input signals in the second photonic waveguide are combined into a single output signal in the first photonic waveguide.

19. The photonic device of claim 18, wherein the first angled reflector and the second angled reflector each comprise a metal layer or a multi-layer dielectric structure comprising one of alternating $Si/SiO_2$ layers, alternating $SiN/SiO_2$ layers, or alternating $Ta_2O_5/SiO_2$ layers.

20. The photonic device of claim 18, wherein the first photonic waveguide and the second photonic waveguide are each formed of one of Si, SiN, $LiNbO_3$, $BaTiO_3$, or a polymer material.

* * * * *